US005501888A

United States Patent [19]

Hanson et al.

[11] Patent Number: 5,501,888

[45] Date of Patent: Mar. 26, 1996

[54] DIVIDED LIGHT INSERT AND KIT FOR MOUNTING

[75] Inventors: Craig Hanson, Oakdale, Minn.; John Gallagher, Amery, Wis.; Kirk Schneider, Eden Prairie, Minn.

[73] Assignee: Anderson Corporation, Bayport, Minn.

[21] Appl. No.: 379,038

[22] Filed: Jan. 27, 1996

Related U.S. Application Data

[63] Continuation of Ser. No. 16,902, Feb. 12, 1993, abandoned.

[51] Int. Cl.$^6$ ................................ B44C 5/08; B44C 1/16; B32B 17/00; E06B 3/54

[52] U.S. Cl. ................................ 428/38; 428/34; 156/63; 156/100; 52/204.59; 52/477; 52/745.1; 52/656.5; 52/734.2

[58] Field of Search .......................... 428/38, 39; 156/63, 156/100; 52/204.59, 475, 477, 656

[56] References Cited

U.S. PATENT DOCUMENTS

| | | | |
|---|---|---|---|
| 368,413 | 8/1887 | Morgan et al. . | |
| 991,847 | 5/1911 | Henderson . | |
| 1,158,144 | 10/1915 | Oberhacke | 52/204.59 |
| 1,686,809 | 10/1928 | Grau . | |
| 2,991,213 | 7/1961 | Williams | 154/116 |
| 3,560,317 | 2/1971 | Nanny et al. | 161/43 |
| 4,115,973 | 9/1978 | Anderson | 428/542.8 |
| 4,223,499 | 9/1980 | Schrunk | 52/308 |
| 4,252,847 | 2/1981 | DelGrande | 428/38 |
| 4,610,901 | 9/1986 | Linscott | 428/38 |
| 4,746,695 | 5/1988 | Berly | 524/13 |
| 4,977,010 | 12/1990 | Washa | 428/83 |
| 5,134,004 | 7/1992 | Moline | 428/38 |

*Primary Examiner*—George F. Lesmes
*Assistant Examiner*—Kathryne E. Shelborne
*Attorney, Agent, or Firm*—Merchant, Gould, Smith, Edell, Welter & Schmidt

[57] ABSTRACT

The present invention provides a divided light inserts which employ metal caming and a kit for mounting the inserts on existing windows. The preferred divided light inserts use substantially lead-free, rigid caming which incorporates a flange and steel core around the perimeter of the insert. The preferred mounting kit provides for ventilation between the insert and the primary glazing panel of a window in which the insert is mounted.

29 Claims, 3 Drawing Sheets

FIG. 1
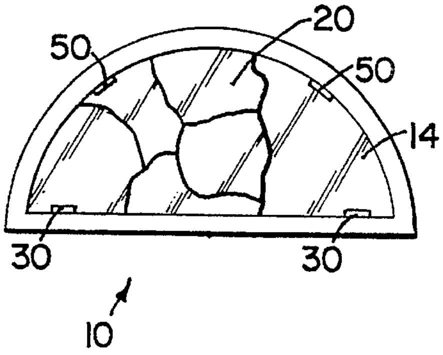
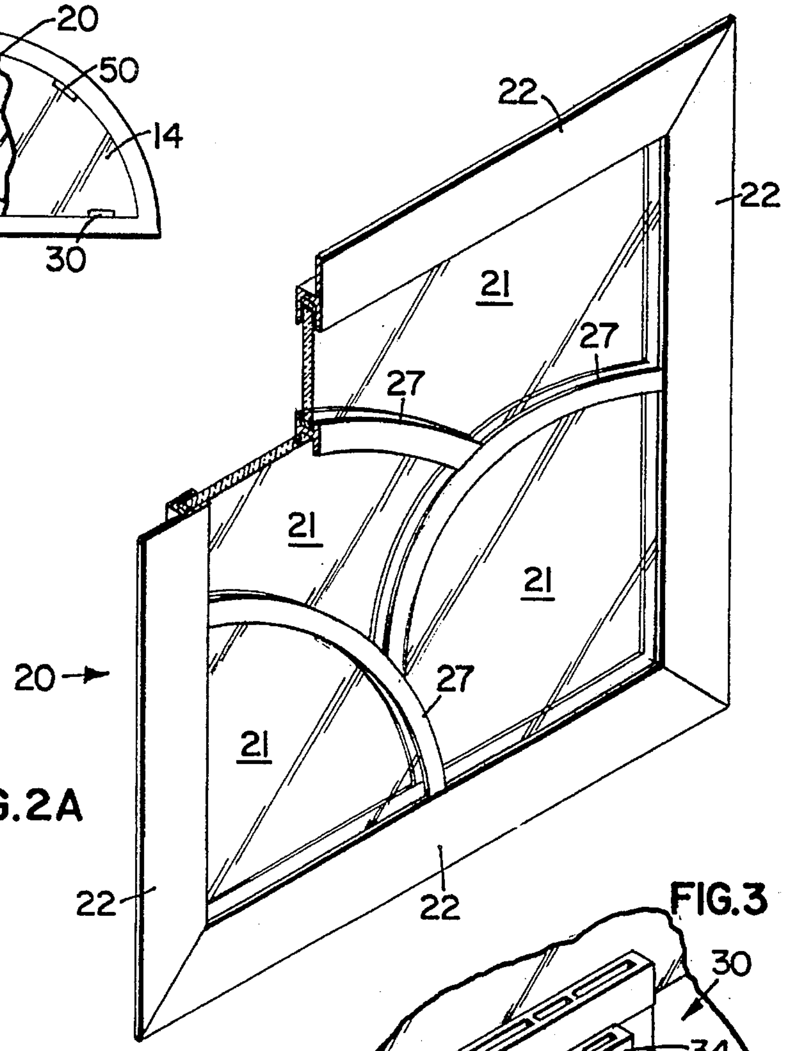
FIG.2A
FIG.3
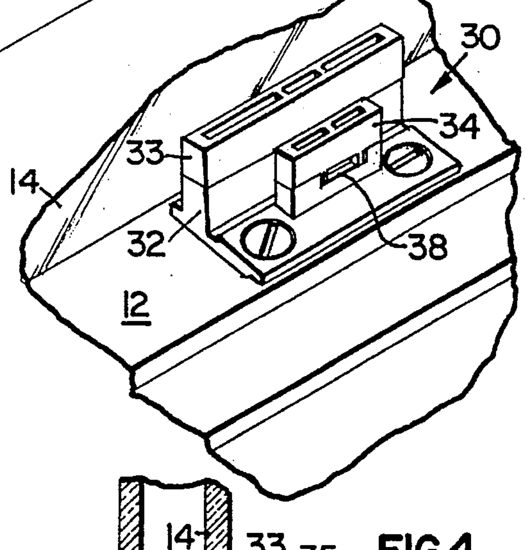
FIG.2B
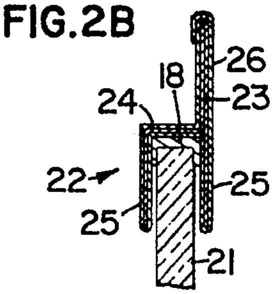
FIG.2C
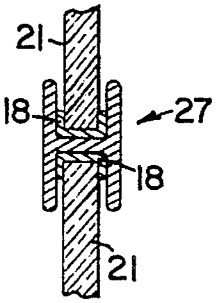
FIG.4
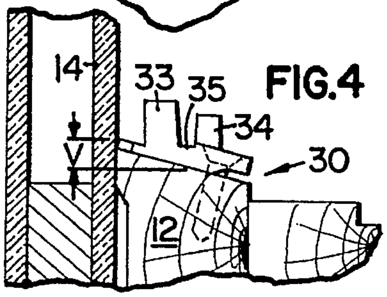

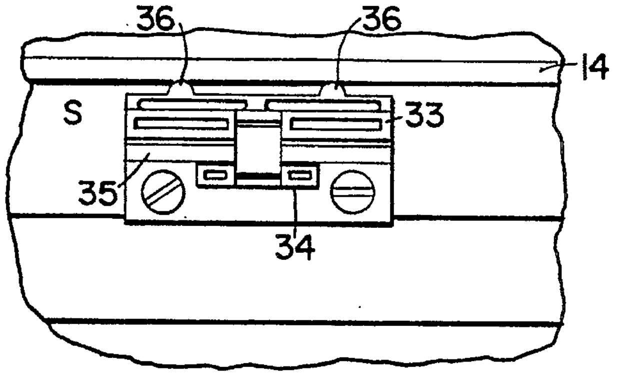
FIG. 5
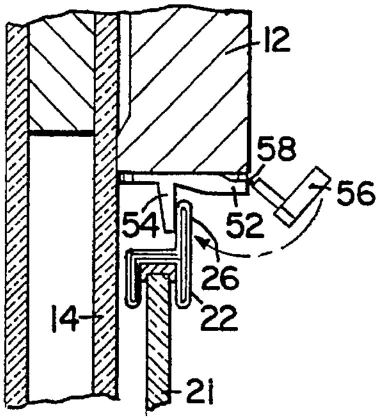
FIG. 7
FIG. 8
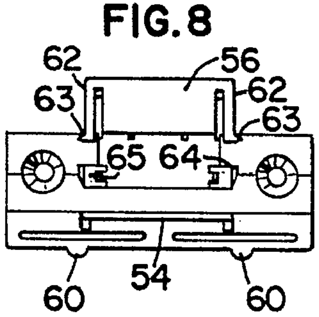
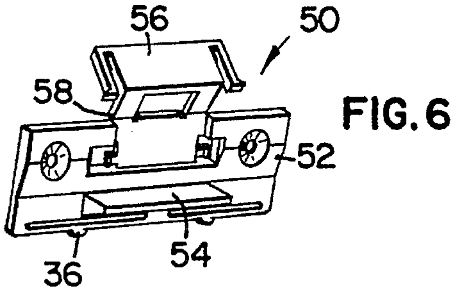
FIG. 6
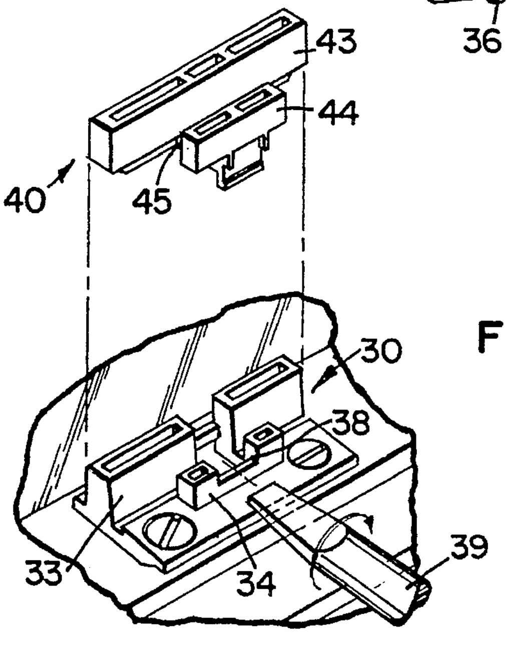
FIG. 9

DIVIDED LIGHT INSERT AND KIT FOR MOUNTING

This is a continuation of application Ser. No. 08/016,902, filed Feb. 12, 1993, now abandoned.

FIELD OF THE INVENTION

The present invention relates to the field of divided light inserts for windows. More particularly, the present invention relates to the design of a divided light insert and a kit for mounting the same in an existing window.

BACKGROUND OF THE INVENTION

True divided light glass products for windows are typically available from glass studios doing custom glass work in a local region or from window manufacturers through local dealers who offer decorative glass products in a variety of standard designs. Decorative glass products for windows alone are somewhat uncommon and in most cases are very simply designed with a minimum of panels and generally linear or smoothly curved panel edges.

The methods and tools used by stained glass artisans have changed little over the centuries. The majority of contemporary stained glass and other divided light products are created using colored/textured glass, lead cames which are soldered together, and putty which is forced between the cames and the glass to seal the unit. While the tools and materials have improved slightly, the process of cutting the glass and glazing it together has remained substantially the same.

The traditional manufacturing process is labor intensive and results in an expensive final product.

Other problems with true divided light glass products manufactured according to traditional methods include inconsistent quality and long delivery time due to the labor intensive nature of the manufacturing process. More importantly, the finished products are too fragile to be shipped or handled during installation without special precautions which only add to the final cost of the product.

Because of the problems with true divided light glass products, attempts have been made to produce look-alike products and/or substitute other types of decorative glass products in place of a true divided light glass product. Some products have been made from plastic film or have consisted of artificial cames applied to single sheets of glass. Other attempts have included the cutting of individual pieces of glass and injecting a lead substitute material between the pieces. The final product is, however, not equal in appearance or performance to a true divided light glass product in which metal cames are used to divide the individual lights in each panel.

Another problem common to both traditional divided light products as well as many of the products sold as substitutes is the use of exposed lead in the caming separating the divided light panels. Lead is a known health hazard and its use in products destined for the residential market is extremely undesirable.

Other manufacturers have recognized the lead exposure problem and attempted to provide caming materials which had the appearance of traditional lead caming, but their solutions provided cames which were not as flexible as lead caming. As a result, the designs provided by the manufacturers using the stiffer substitute caming were limited as edges and curves with smaller radii were impossible to form using the substitute caming. As a result, their products generally lack the aesthetic appeal of traditional divided light products.

As a result, a need exists for a true divided light glass product which can be added to existing windows, avoids the high cost of traditional divided light design, retains the aesthetic appeal of the traditional product and employs lead-free caming materials.

SUMMARY OF THE INVENTION

The present invention provides a divided light glass product which employs metal caming and a fastening system for use on existing windows. When combined with the decorative divided light glass inserts, the system provides a substantially lead-free divided light window which retains the appearance of a traditional divided light glass window while avoiding the high cost, inconsistent quality, and fragility of such products.

A preferred decorative divided light glass insert according to the present invention uses true divided light glass panels joined in the interior of the insert by a formed solid zinc alloy caming having a H-shaped cross-section. A substantially lead-free zinc alloy is used because it can be treated to appear similar to traditional lead caming while providing increased rigidity necessary for shipping and handling.

An additional advantage of the preferred zinc alloy is that it is lighter than traditional lead caming which reduces the stresses placed on the inserts during shipping and installation. Because it is both lighter and stronger than traditional lead caming, the preferred zinc alloy caming has a higher strength-weight ratio than traditional lead caming.

To provide additional rigidity to the insert, the edge caming running around the perimeter of the insert has an h-shaped cross-section which provides a flange to increase rigidity. The flange also provides a convenient mounting edge for retaining the insert in position in a window.

The preferred edge caming is constructed with a steel core. The preferred steel core is roll-formed from a strip of steel sheet metal into a substantially h-shaped core matching the overall profile of the edge caming. The steel core provides additional rigidity to the edge caming and, thus, to the perimeter of each insert. Rigidity at the perimeter of the inserts is extremely important maintain their integrity during shipping and installation or removal of the inserts.

In the preferred embodiment, the steel core is surrounded by a roll-formed covering of sheet metal made of a zinc alloy. The zinc sheet metal is used because, like the preferred zinc alloy used for the interior caming, it can also be treated to have a similar appearance to traditional lead caming without the disadvantages associated with traditional lead caming.

Each individual glass light is held in both the interior and edge caming using a bead of silicone. The silicone provides a better seal than the putty used in traditional divided light glass products, as well as adhesive properties and the ability to absorb shock when the insert is being transported, installed or removed from the window.

The increased rigidity offered by the preferred edge caming and interior caming, as well as the properties of the preferred silicone sealant all combine to provide preferred divided light inserts which provide the aesthetic appeal of traditional divided light panels while avoiding the disadvantages associated with traditional divided light panels. As a result, the preferred inserts according to the present invention can be shipped and handled during installation and removal without the care necessary with traditional products.

The mounting kit of the present invention also provides distinct advantages. The preferred mounting kit includes mounting blocks which are typically mounted on the lower frame members. The preferred mounting blocks provide a channel designed to receive the flange of the edge caming of the inserts.

Also included in the preferred mounting kit are releasable fasteners which have both open and closed positions. The releasable fasteners are typically mounted on the sides or upper frame members of the window. In the open position, a divided light insert can be moved into position in the window. Once in position, the fastener is closed, thereby retaining the insert proximate the primary glazing panel of the window to which it is attached.

Both the preferred mounting blocks and the releasable fasteners are designed to be attached to the window frame before the insert is positioned in the window.

The preferred releasable fasteners are designed to be moved into the closed position without tools. That is an important feature as it is difficult and potentially dangerous for the installer to both place the insert in the window and hold it in position while manipulating a screwdriver or other device to fix the insert in position.

The preferred releasable fasteners also allow the removal of the divided light inserts without tools for repair if breakage occurs or for routine cleaning and maintenance of the window. Once again, the ability to remove and install the inserts without tools adds to the ease of maintenance and safety provided by the preferred embodiments of the present invention.

The preferred mounting kit also maintains the proper spacing between the insert and the primary glazing panel of the window, as well as between the edge caming and frame members of the window. Proper spacing of all those dimensions is necessary to provide sufficient ventilation between the primary glazing panel and divided light insert to avoid excessive condensation or heat build-up between those panels. Excessive condensation can damage the window frames and excessive heat build-up between the insert and primary glazing panel can, in some instances, crack the primary glazing panel or the lights in the insert.

The preferred mounting kit also includes a finished surround molding system which masks the mounting blocks, releasable fasteners and spacing around the insert, giving the appearance of a traditional divided light glass product. The preferred system also maintains proper spacing between the molding and the divided light insert to avoid limiting the ventilation between the divided light insert and the primary glazing panel.

These and other various features and advantages of the present invention will become apparent upon a reading of the detailed description below and referencing the drawings.

BRIEF DESCRIPTION OF THE DRAWINGS

FIG. 1 depicts a divided light glass insert according to the present invention in partial cut-away in an existing window.

FIG. 2A is a perspective view in partial cross-section of a divided light insert according to the present invention.

FIG. 2B is an enlarged cross-section of a preferred edge caming according to the present invention.

FIG. 2C is an enlarged cross-sectional view of a preferred interior caming according to the present invention.

FIG. 3 is a perspective view of a preferred mounting block in position on the frame of a window.

FIG. 4 is a side elevational view of the mounting block of FIG. 3 with the window in cross-section.

FIG. 5 is a top view of the mounting block of FIG. 3.

FIG. 6 is a perspective view of a preferred releasable fastener of the present invention attached to an existing window frame with the releasable fastener in an open position and an insert in position for retention.

FIG. 7 is a side elevational view of the releasable fastener of FIG. 6.

FIG. 8 is a plan view of a preferred releasable fastener according to the present invention, with the fastener in the open position.

FIG. 9 is an exploded perspective view of a preferred mounting block according to the present invention with a shim removed from the same.

DETAILED DESCRIPTION OF THE PREFERRED EMBODIMENTS

Figure 10:
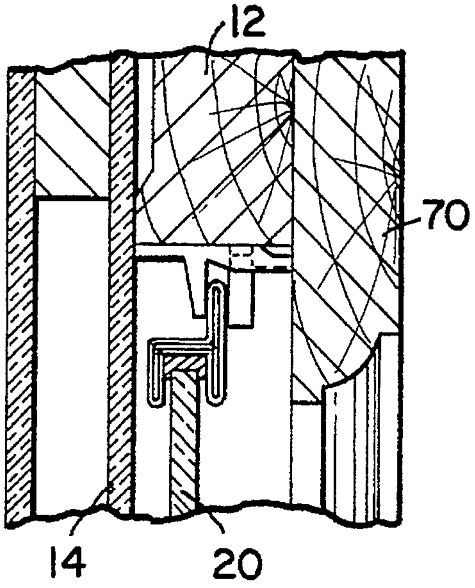
FIGS. 10 & 11 are cross-sectional views of windows including a decorative divided light glass insert according to the present invention and the surround molding used in the preferred mounting kit.

Referring to FIG. 1, which depicts a preferred decorative divided light insert according to the present invention in a partial cut-away view as installed on an existing window 10. The window 10 includes frame members, collectively referred to as 12, and a primary glazing panel 14.

The preferred kit according to the present invention used to install the divided light insert 20 on the window 10, also depicted in FIG. 1, includes mounting blocks 30 attached to the lower frame member 12 and releasable fasteners 50 attached to the upper frame member 12. Although a specific window 20 is depicted in FIG. 1, it will be understood that inserts 20 can be added to windows having any shape.

PREFERRED DIVIDED LIGHT INSERTS

A preferred embodiment of a divided light insert 20 according to the present invention is depicted in FIG. 2A. The preferred insert 20 includes an edge caming 22 surrounding the perimeter of the individual divided lights 21 forming the insert 20. In the interior of the insert 20 the individual divided lights 21 are separated by interior caming 27.

The preferred edge caming 22 and interior caming 27 have exterior surfaces of zinc alloys which are chemically or otherwise treated to have an appearance similar to that of lead. All joints between the cames 22 and 27 are soldered, as in traditional divided light panels. The solder used in the joints is, however, lead-free solder such as that used in plumbing and other applications.

The divided lights 21 referred to in conjunction with the present invention should not be limited to stained or colored glass. As referred to in connection with the present invention, the divided lights 21 could be clear, colored, beveled, convex or concave and have many other features which may be desired in a decorative divided light glass product. In addition, the lights 21 may be formed of a transparent or translucent material other than glass if desired by the designer.

The preferred edge caming 22 according to the present invention is depicted in enlarged cross-section in FIG. 2B. The preferred edge caming 22 includes a roll-formed steel core 23 in its interior which is surrounded by a roll-formed zinc exterior 26. The flange 26 extending from the channel formed by legs 25 and base section 24 provides additional strength and rigidity to the edge caming 22. That extra rigidity is particularly advantageous for inserts 20 according to the present invention as it provides rigidity and strength during transport as well as insertion and removal of the insert 20.

In addition, the flange 26 is useful for mounting the insert 20 in a window as discussed in more detail below.

It will be understood that other caming designs, such as H-shaped or y-shaped caming, could be substituted for the preferred embodiment described herein. The considerations in providing such an alternate design should include the strength and rigidity of the edge caming as well as provisions for mounting the same on a window.

The preferred edge caming 22 uses a core 23 roll-formed from a strip of steel sheet metal (in the preferred embodiment) because it is economical and provides the additional rigidity necessary to maintain the integrity of the perimeter of the insert 20 during shipping and installation/removal. The core 23 should include a flange similar to the overall design of the edge caming 22. The flange provides the additional rigidity needed from the core 23. It will be understood that many other materials could be used to form core 23, including but not limited to, other metals such as aluminum, brass, etc., which are either roll-formed from sheet metal, extruded, roll-formed from solid stock or any other suitable metal forming process. In addition, the core 23 could be formed of many other materials other than metals including, but not limited to, composite materials incorporating carbon fibers or other structural enhancing materials, metal matrix composites, etc.

The preferred edge caming uses an outer covering 26 of a roll-formed zinc sheet metal because it can be treated to provide an appearance similar to traditional lead caming and is economical to use. It is envisioned that the edge caming 26 may encompass a core 23 with a metallic or other coating 26 sputtered, electro-plated or otherwise deposited on the core 23 to provide a desired finish and appearance. As one example, the edge caming 26 may be formed of an aluminum alloy or other material which could be anodized or treated to have a desired appearance or color.

The channel formed by the individual legs 25 and base section 24 of the edge caming 22 is preferably lined with a bead of silicone 18 before a divided light 21 is inserted into the edge caming 22. The silicone caulk 18 is used because of its adhesive properties as well as its ability to seal the edge caming 22 to the divided light 21. The silicone 18 also provides resiliency and cushioning to the divided light 21 during shipping and transport. It will be understood that other sealants could be substituted for the preferred silicone sealant provided they have suitable properties.

Referring to FIG. 2C, the preferred interior caming 27 according to the present invention is constructed of a solid piece of zinc alloy. A zinc alloy is used in place of lead caming because it provides strength and rigidity advantages over lead caming which are needed to maintain the integrity of the insert 20 during shipping and handling. The zinc alloy can be chemically treated to provide an appearance similar to traditional lead caming.

The preferred zinc alloy used in interior caming 27 is roll-formed from a solid zinc rod and has a finished cross-section which is substantially H-shaped, forming two channels to receive the edges of lights 21 in insert 20. The preferred zinc alloy for a majority of the interior caming 27 is substantially lead-free and is available as Platt Alloy #296 from The Platt Bros. & Co., Waterbury, Conn.

An alternate preferred zinc alloy is used for the interior caming 27 which must formed around lights 21 with curves having small radii, such as small circles or other features. As such, the interior caming 27 used in those areas must be more flexible than the preferred zinc alloy described above. The preferred zinc alloy used in situations requiring more flexibility is Platt Alloy #302, also available from The Platt Bros. & Co., Waterbury, Conn.

The preferred zinc alloys are both substantially lead-free to minimize the problems associated with exposure to lead in a residential environment. In the Preferred alloy, the lead content of the interior caming will not exceed 0.010% (by weight). A more preferred limit for the lead content of the alloy is 0.006%, with the most preferred alloy having an upper limit of 0.001% lead content.

Although the preferred interior caming 27 is formed with solid zinc alloy cross-sections, it will be understood that other metals and metal alloys could be substituted for the preferred compositions described above. The interior caming could also be formed using many different processes and techniques other than roll-forming.

One alternate preferred embodiment for the interior caming according to the present invention comprises an H-shaped cross-section formed of roll-formed strips of sheet metal, preferably zinc. Such caming is known to those skilled in the art and can be used for the interior caming in inserts 20 according to the present invention. One example of such caming is disclosed in U.S. Pat. No. 991,847 to Henderson, which is hereby incorporated by reference for its disclosure regarding the formation of roll-formed sheet metal caming. It should, however, be understood that the preferred solid zinc alloy caming described above offers rigidity and strength not provided by interior caming formed of sheet metal.

Another alternate preferred embodiment of the interior caming according to the present invention comprises an H-shaped cross-section formed of copper foil. This embodiment is particularly useful where very flexible caming is needed to follow a small radius bend in the insert design. Once in place, the copper is coated with a layer of the preferred solder to present a lead-like appearance.

As with the edge caming 22, the channels formed in the H-shaped interior caming 27 are also filled with beads of silicone 18 prior to insertion of the divided lights 21 for the adhesive, sealing and damping properties of the silicone 18. As above, other sealants or fillers could be substituted in place of silicone.

The design of the preferred divided light insert 20 as described above provides advantages over traditional divided light designs. In particular, the use of roll formed solid zinc alloy interior caming 27 and edge caming 22 with steel cores 23 surrounded by a roll-formed zinc exterior 26 eliminate the need for bracing common in traditional lead caming designs while retaining the aesthetic appeal of those traditional techniques. In addition, the design of the preferred inserts 20 is able to withstand the stresses encountered during shipping and handling of the inserts 20, as well as during installation and removal for periodic cleaning and/or repair.

PREFERRED MOUNTING KIT

The mounting kits according to the present invention comprise an insert 20 and retaining means for attaching the insert 20 proximate the primary glazing panel 14 as well as ventilating means for providing ventilation between the insert 20 and the primary glazing panel 14. In the preferred kit, the retaining means and ventilating means are both found in the preferred mounting blocks 30 and releasable fasteners 50 which are described below.

Alternatively, however, it will be understood that the retaining means could be separated from the ventilating means through the use of spacers and other fastening systems. The preferred embodiments described below, however, provide an integrated, efficient mounting and ventilating system.

FIGS. 3–5 depict the preferred design of the mounting blocks 30 which form a part of the preferred mounting kit according to the present invention. The mounting blocks 30 are typically mounted on lower frame members 12 which are preferably substantially horizontal.

The preferred mounting block 30 includes a base 32 adapted to lie on a frame member 12. The mounting blocks 30 are preferably attached to the frame member 12 with wood screws, although other attachment means could be substituted. It will be understood that the base 32 of the mounting blocks 30 are preferably shaped to complement the profile of the underlying frame member 12. In FIG. 4, for example, it can be seen that the base 32 is angled off of the horizontal to provide substantially vertical upper features to the mounting block 30.

Back wall 33 of the mounting block 30 preferably rises substantially vertically from the base 32 and is proximate the primary glazing panel 14 of the window 10. The front wall 34 preferably also rises substantially vertically from base 32. Back wall 33 and front wall 34 combine to define a channel between them having a lower surface 35. That channel receives the lower flange 26 of an insert 20 to prevent transverse motion once installed. It is lower surface 35 that supports the flange 26 on edge caming 22 of an insert 20.

Referring to FIG. 5, the proper spacing of mounting block 30 with respect to the primary glazing panel 14 is accomplished by the use of spacing bumps 36 which are designed to contact the primary glazing panel 14 when the mounting block 30 is in a proper relationship to the primary glazing panel 14. Other means of spacing the mounting blocks 30 will be readily recognized, such as removable spacers or templates designed for use during attachment of the mounting blocks 30 to the windrow frame 12.

When the mounting blocks 30 are spaced the proper distance from the primary glazing panel 14, the center line of the channel formed by the back wall 33 and front wall 34 of the mounting block is a preferred distance "s" from the primary glazing panel 14 (see FIG. 5). This preferred distance "s" is related to the preferred distance between the flange 26 of the edge caming 22 and lower frame member 12, which is indicated by the letter "v" in FIG. 4.

In the preferred embodiments, the distance "s" is approximately equal to the distance "v" to provide optimum ventilation between an insert 20 and the primary glazing panel 14. As discussed above, ventilation is necessary to minimize condensation and heat build-up between the primary glazing panel 14 and insert 20. The preferred distances of "v" and "s" are approximately 3/16 inch (5 millimeters). At those distances, the ventilation between the primary glazing panel 14 and the insert 20 appears to be maximized.

The preferred mounting blocks 30 of the present invention are designed to aid in reaching that preferred distance "v" and those features of the design are described in further detail with respect to FIG. 9 below.

FIGS. 6–8 depict the preferred embodiment of the releasable fastener 50 according to the present invention. As depicted there, the fastener 50 is attached to a frame member 12. The releasable fastener 50 is preferably used on side frame members or upper horizontal frame members while the preferred mounting blocks 30 are used on lower, substantially horizontal frame members. In the preferred embodiment the releasable fastener 50 is attached to the frame member 12 using wood screws although other methods of attachment could be used in place of wood screws.

Referring to FIG. 8, the spacing of the releasable fasteners 50 with respect to the primary glazing panel 14 is also accomplished through the use of spacing bumps 60 formed on releasable fastener 50. The spacing bumps 60 function in the same manner as the spacing bumps 36 on the mounting block 30 as described above and could also be replaced by the alternate means described above.

The preferred releasable fastener 50 has both an open and closed position. FIGS. 6–8 depict the releasable fastener 50 in its open position. The preferred fastener includes a stationary back stop 54 against which flange 26 of edge caming 22 of insert 20 rests when properly positioned. The preferred releasable fastener 50 also includes a movable front stop 56 which is hinged along lines 58 as depicted in FIGS. 7 and 8.

The hinging of the front stop 56 allows proper positioning of an insert 20 in the releasable fastener 50 and subsequent closing of the fastener 50 without tools to lock insert 20 in position proximate the primary glazing panel 14. The ability to install the insert 20 without tools when it is in position on the window 10 is important to maximize safety and minimize the possibility of dropping the insert 20 during installation or removal for maintenance.

Referring to FIG. 8, when the preferred releasable fastener 50 is in its closed position with the front stop 56 rotated into position, the legs 62 on front stop 56 are preferably forced through the openings 64 in the base 52 of the fastener 50. Legs 62 are preferably formed with catches 63 on their distal ends which cooperate with the opening 64 in base 52 to retain the front stop 56 in its closed position. Also in the preferred embodiment, the openings 64 include retaining legs 65 which urge the catches 63 on front stop 56 into cooperation with the openings 64 in base 52.

In the preferred embodiment, the catches 63 preferably face along a line parallel to hinge lines 58 (i.e., along the length of the releasable fastener 50). That orientation allows the catches 63 to retain their ability to cooperate with the openings 64 when the releasable fastener 50 is curved to match a frame member 12 that is curved as in a semi-circular oval or other curved window.

Although a specific preferred releasable fastener 50 is described above, it will be understood that many other designs could be substituted for those described above, provided they have both open and closed positions and can be easily moved from the open to the closed position during installation or removal of the inserts 20.

Also, although the preferred mounting kits include both mounting blocks 30 and releasable fasteners 50, it will be understood that the mounting kit of the present invention could be provide with only mounting blocks 30, only releasable fasteners 50 or other suitable retaining means for attaching the inserts 20 to existing windows as well as ventilating means for providing ventilation between the insert 20 and the primary glazing panel 14.

The preferred mounting blocks 30 and releasable fasteners 50 according to the present invention are preferably formed using an injection molding process of a suitable resilient plastic material. The mounting blocks 30 and fasteners 50 may, however, be constructed of many different materials and methods which will be understood by those skilled in the art.

Referring now to FIGS. 1, 6, and 9, the preferred method of assembling the insert 20 with preferred mounting blocks 30 and preferred releasable fasteners 50 will be described. The user will first attach mounting blocks 30 and releasable fasteners 50 around the window frame in positions abutting the primary glazing panel 14.

As described above, the mounting blocks and releasable fasteners 50 are preferably designed to provide 3⁄16 inch (5 millimeter) spacing between the insert 20 and the primary glazing panel 14.

Referring to FIG. 9, the preferred mounting block 30 is provided with a shim 40 attached to the upper surfaces of the mounting block 30. The shim 40 includes a front wall 43 and back wall 44 which help define a channel with a lower surface 45. Those features all correspond and mate with similar features found in the mounting blocks 30 themselves. In that way, the distance "v" (see FIG. 4) can be adjusted to provide a sufficient amount of space between the lower flange 26 on an insert 20 and the frame member 12.

Because the tolerances between windows of the same size can vary, the mounting kit must compensate for those variations while providing spacings that are as close to the optimal as possible. To account for those variations in the preferred embodiment, the mounting block 30 is provided with a large shim for the maximum spacing and a small shim for a lesser amount of spacing. The smaller shim preferably corresponds to the nominal spacing for the distance "v" (i.e., 3⁄16" or 5 mm). The mounting block 30 can also be used without either shim to provide a third, yet lower position for the flange 26 of the insert 20. As a result, the user has the choice of three varying distances for the "v" dimension.

In the preferred embodiment, the largest shim 40 is supplied attached to the mounting block 30. When attached, each shim 40 provides a slot 38 adapted to receive the blade 39 of a standard screwdriver. Once inserted into slot 38, the blade 39 is rotated to pry the shim 40 from mounting block 30. In that way, the shims 40 can be removed from the mounting block 30 by the user. A smaller shim can then be attached or no shim can be attached to the mounting block 30 as desired by the user.

It will be understood that the shims 40 and mounting blocks 30 can take many designs with only one preferred embodiment being depicted in the present drawings. As one example, the preferred shims 40 could be replaced by spacers which could be placed underneath the base 32 of the mounting block to vary the space between the flange 26 and frame member 12. Other variations are possible and are dependent on the design of the mounting blocks 30.

Returning to the installation procedure, with the mounting block 30 and large shim 40 attached to a window frame 12, the insert panel 20 is preferably placed with its lower flange 26 resting in the channel formed by the mounting blocks 30 and the top of the insert 20 rotated out, away from the window. The top of the insert 20 is then rotated toward the primary glazing panel 14 until the releasable fasteners 50 are reached by the upper flange 26 in insert 20.

Because the large shim 40 is preferably in place, in many instances the top of the insert 20 will not reach its proper position in the releasable fastener 50 as the top flange 26 of the insert 20 will be too high. In that case, the insert 20 is removed from the mounting block 30. The large shim 40 is then removed from the mounting block 30 using the screwdriver slot 38 to forcibly remove the shim 40.

The user will then attach a smaller shim 40 which corresponds to the nominal spacing for the distance "v" between the flange 26 of the insert 20 and the frame member 12 of the window. Once again, the top of the insert 20 will be rotated into position and the front stop 56 of the releasable fasteners 50 will be moved to the closed position, thereby retaining the insert 20 in position with the proper spacing around the edge caming 22 as well as proper spacing between the insert 20 and the primary glazing panel 14 which is necessary to prevent undue condensation on the primary glazing panel 14 as well as to minimize the heat build-up between the primary glazing panel 14 and insert 20.

If, however, the upper flange 26 of the insert 20 is too high, the insert 20 can again be removed from the mounting blocks 30 to remove the smaller shim 40. At that point, the mounting block 30 provides its lowest mounting position for the insert panel 20 and associated flange 26. As such, when insert panel 20 is again placed in the mounting block 30 and its top is rotated toward the primary glazing panel 14, the uppermost flange will contact the back stop 54 of the preferred releasable fasteners 50, and the fastener 50 is closed to retain the flange 26 within the releasable fastener 50.

Figure 11:
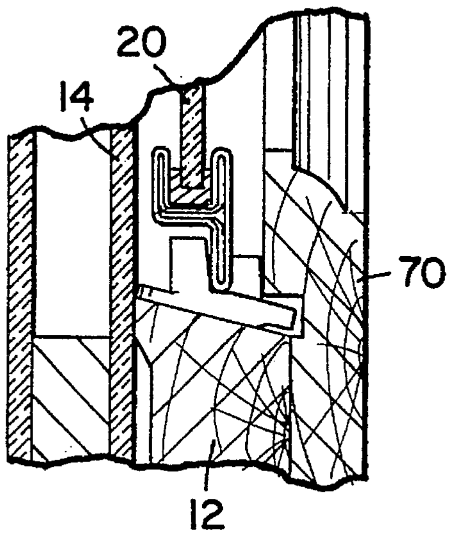

Referring to FIGS. 10 and 11, the preferred mounting kit also includes moldings to mask the mounting blocks 30 and releasable fasteners 50 as well as the majority of the edge caming 22 used on insert 20. The molding 70 provides a finished appearance to the installation of the divided light inserts 20.

In the preferred mounting kit, the molding 70 is designed to leave a space between their inner surface (facing the insert 20) and the insert 20 which is substantially equal to the optimal distances between the flange 26 of the edge caming 22 ("v") as well as the space between the insert 20 and the primary glazing panel 14 ("s"). As described above, that optimal distance is approximately 3⁄16" or 5 mm. By maintaining the proper spacing, the effect of the molding 70 on the ventilation between the inserts 20 and the primary glazing panels 14 is minimized.

The preferred molding 70 is constricted of materials matching the window frame 12, although it will be understood that the molding 70 will take many shapes and can be constructed of many different materials as necessary to provide an aesthetically pleasing appearance to the user. The molding 70 is preferably attached to the window frames 12 with the wood screws, although a variety of other attachment methods can be substituted.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention and it is intended that the invention be limited only by the claims and the equivalents thereof.

We claim:

1. A kit for mounting a divided light insert on a window, said kit comprising:
   a) a divided light insert sized to fit proximate a primary glazing panel of said window, said divided light insert further comprising:
      1) a plurality of lights;
      2) interior caming disposed between said lights, said interior caming being substantially lead free, said interior caming having two channels, each of said channels being sized to receive an edge of one of said plurality of lights; and 3) edge caming disposed about a perimeter of said insert, said edge caming comprising a channel receiving edges of said plurality of lights which are proximate said perimeter of said insert and a flange extending away from a center of said insert said edge caming being substantially lead free;

b) retaining means attached to a frame of said window for retaining said divided light insert proximate said window; and c) ventilating means for providing ventilation between said divided light insert and said primary glazing panel.

2. The kit of claim 1, wherein said interior caming and said edge caming have a lead content of no more than 0.010% be weight.

3. The kit of claim 1, wherein said interior caming and said edge caming have a lead content of no more than 0.006% by weight.

4. The kit of claim 1, wherein said interior caming and said edge caming have a lead content of no more than 0.001% by weight.

5. The kit of claim 1, wherein said interior caming has a substantially H-shaped cross-section.

6. The kit of claim 1, wherein said interior caming further comprises a solid cross-section of metal.

7. The kit of claim 6, wherein said interior caming comprises a zinc alloy.

8. The kit of claim 1, wherein said channel of said edge caming further comprises a base section and two substantially parallel legs extending from said base section towards said center of said insert.

9. The kit of claim 8, wherein said edge caming has a substantially h-shaped cross-section.

10. The kit of claim 1, wherein said edge caming is formed of a core comprising a first metal and an exterior covering of a second metal.

11. The kit of claim 10, wherein said first metal of said edge caming comprises steel sheet metal.

12. The kit of claim 10, wherein said second metal of said edge caming comprises zinc sheet metal.

13. The kit of claim 1, wherein said insert further comprises sealant disposed in each of said two channels in said interior caming and said channel in said edge caming.

14. The kit of claim 13, wherein said sealant further comprises silicone.

15. The kit of claim 1, wherein said retaining means further comprises at least one mounting block for attachment to said frame, said mounting block comprising a channel adapted to receive said flange of said edge caming.

16. The kit of claim 1, wherein said retaining means further comprises at least one releasable fastener for attachment to said frame, said releasable fastener having an open position in which said releasable fastener can receive a portion of said insert and a closed position in which said releasable fastener releasably retains said flange of said edge caming.

17. The kit of claim 1, wherein said retaining means further comprises:

a) at least one mounting block for attachment to said frame, said mounting block comprising a channel adapted to receive said flange of said edge caming; and b) at least one releasable fastener for attachment to said frame, said releasable fastener having an open position in which said releasable fastener can receive a portion of said insert and a closed position in which said releasable fastener releasably retains said flange of said edge caming.

18. The kit of claim 1, wherein said ventilating means further comprises:

a) flange spacing means for spacing at least one of said flanges of said insert a first distance from said frame of said window; and b) panel spacing means for spacing said insert a second distance away from and substantially parallel to said primary glazing panel.

19. The kit of claim 18, wherein said first and second distances are substantially equal.

20. The kit of claim 18, wherein said flange spacing means further comprises at least one mounting block for attachment to said frame, said mounting block comprising a channel adapted to receive said flange of said edge caming, and further wherein said mounting block positions said flange spaced from said frame, whereby air can pass between said flange and said frame.

21. The kit of claim 18, wherein said panel spacing means further comprises at least one mounting block for attachment to said frame, said mounting block comprising a channel adapted to receive said flange of said edge coming and further wherein said panel spacing means further comprises spacing bumps on each of said mounting blocks, said spacing bumps positioning said channel spaced from said primary glazing panel.

22. The kit of claim 18, wherein said flange spacing means further comprises at least one shim interposed between said flange of said frame.

23. The kit of claim 18, wherein said retaining means further comprises at least one mounting block for attachment to said frame, said mounting block comprising a channel adapted to receive said flange of said edge caming and further wherein:

a) said flange spacing means comprises said at least one mounting block which positions said flange spaced a first distance from said frame; and b) said panel spacing means comprises spacing bumps on said at least one mounting block, said spacing bumps positioning said channel spaced a second distance from said primary glazing panel, whereby air can pass between said flange and said frame and between said insert and said primary glazing panel.

24. The kit of claim 23, wherein said first distance is substantially equal to said second distance.

25. The kit of claim 1, further comprising means for masking at least a portion of the edge caming from viewing.

26. The kit of claim 25, wherein said means for masking comprises a molding attached to said frame of said window.

27. The kit of claim 26, wherein said molding is spaced a third distance from said insert.

28. A kit for mounting a divided light insert on a window, said kit comprising:

a) a divided light insert sized to fit proximate a primary glazing panel of said window, said divided light insert further comprising:

1) a plurality of lights;

2) interior caming disposed between said lights, said interior caming being substantially lead free, said interior caming having two channels, each of said channels being sized to receive an edge of one of said plurality of lights, said interior caming being formed of a first metal;

3) edge caming disposed about a perimeter of said insert, said edge caming comprising a channel receiving edges of said plurality of lights which are proximate said perimeter of said insert and a flange extending away from a center of said insert, said edge caming being formed of a center section comprising a second metal and an exterior covering of a third metal, said edge caming being substantially lead free;

4) sealant disposed in each of said two channels in said interior caming and said channel in said edge caming;

b) retaining means attached to a frame of said window for retaining said divided light insert proximate said window, said retaining means retaining said flange spaced a first distance from said frame of said window, said retaining means further retaining said insert in a plane spaced a second distance from and substantially parallel to said primary glazing panel; and c) means for masking at least a portion of said edge caming and said frame of said window from viewing, said means for masking comprising a molding attached to said frame of said window, said molding being spaced a third distance from said insert, said first, second and third distances being substantially equal.

29. A kit for mounting a divided light insert on a window, said kit comprising:

a) a divided light insert sized to fit proximate a primary glazing panel of said window, said divided light insert further comprising:

1) a plurality of lights;

2) interior caming disposed between said lights, said interior caming having two channels, each of said channels being sized to receive an edge of one of said plurality of lights;

3) edge caming disposed about a perimeter of said insert, said edge caming comprising a channel receiving edges of said plurality of lights which are proximate said perimeter of said insert and a flange extending away from a center of said insert, said edge caming being formed of a core comprising a first metal and an exterior covering a second metal, wherein said interior caming and said edge caming are substantially lead free; and 4) sealant disposed in each of said two channels in said interior caming and said channel in said edge caming;

b) retaining means attached to a frame of said window for retaining said divided light insert proximate said window; and c) ventilating means for providing ventilation between said divided light insert and said primary glazing panel.

* * * * *

UNITED STATES PATENT AND TRADEMARK OFFICE
CERTIFICATE OF CORRECTION

PATENT NO. : 5,501,888

DATED : March 26, 1996

INVENTOR(S) : Craig Hanson et al.

It is certified that error appears in the above-identified patent and that said Letters Patent is hereby corrected as shown below:

On title page, item [73], please delete "Anderson" and substitute therefor --Andersen--.

item [22], please delete "Jan. 27, 1996" and substitute therefor --Jan. 27, 1995--.

Signed and Sealed this

Twentieth Day of August, 1996

*Attest:*

BRUCE LEHMAN

*Attesting Officer* *Commissioner of Patents and Trademarks*